United States Patent [19]
Kephart

[11] Patent Number: 5,272,386
[45] Date of Patent: Dec. 21, 1993

[54] PROGRAMMABLE TIMER POWER SWITCH UNIT WITH EMERGENCY OVERRIDE RESET

[76] Inventor: David A. Kephart, 813 Logan Blvd., Hollidaysburg, Pa. 16648

[21] Appl. No.: 835,491

[22] Filed: Feb. 14, 1992

[51] Int. Cl.$^5$ ............................................... H02H 7/00
[52] U.S. Cl. ................... 307/116; 307/10.1; 307/125; 307/141; 307/10.7
[58] Field of Search ...................... 307/9.1, 10.1, 10.7, 307/39, 112, 116, 117, 125, 126, 130, 131, 141; 320/29, 30, 31, 32, 33, 34, 48; 340/428, 429, 430, 438, 459, 527, 636, 825.22; 364/424.01, 424.05

[56] References Cited

U.S. PATENT DOCUMENTS

| | | | |
|---|---|---|---|
| 4,665,370 | 5/1987 | Holland | 340/636 |
| 4,719,427 | 1/1988 | Morishita et al. | 320/48 |
| 4,733,100 | 3/1988 | Nusairat et al. | 307/10.7 |
| 4,779,050 | 10/1988 | Ohnari | 320/48 |
| 4,950,913 | 8/1990 | Kephart | 307/10.7 |
| 5,191,500 | 3/1993 | Hatano et al. | 307/10.1 |

Primary Examiner—Jeffrey A. Gaffin
Attorney, Agent, or Firm—Dennison, Meserole, Pollack & Scheiner

[57] ABSTRACT

A programmable timer power switch unit with emergency override reset for use with a battery includes a power switch which receives power from the battery and switches the power to equipment. The unit also has a plurality of voltage detectors connected to the battery to detect a plurality of voltages and a vibration-pressure detector which detects any movement of the motor. There is a timer-control logic which is connected to the components and disables the power switch when voltage problems are detected. The unit further includes a programmable delay switch. The purpose of this switch is to allow the equipment to run during a pre-selected time. Also, there is an auto/manual override switch for overriding the timer-control logic and providing a short delay time prior to disconnecting the unit in order to protect any memory intensive electronic equipment from intermittent drop-outs such as when the engine is started.

20 Claims, 4 Drawing Sheets

PROGRAMMABLE TIMER POWER SWITCH UNIT WITH EMERGENCY OVERRIDE RESET

BACKGROUND OF THE INVENTION

1. Field of the Invention

The present invention incorporates by reference U.S. Pat. No. 4,950,913 issued Aug. 21, 1990. This patent relates to a monitoring device for monitoring a system battery powering an external device, such as a two-way radio, when the motor is not running. During this time, the battery is discharged by the external device. A timer in the monitoring device allows the radio to run for a pre-set time. U.S. Pat. No. 4,950,913 also includes a separate voltage detector which will override the timer and shut off the radio upon the detection of a low battery voltage as well as a vibration detector which detects vibrations from the engine to reset the timer whenever the motor is started.

The battery of the automobile powers CBs, AM/FM radios, two-way radios, cellular phones, radar devices and other electronic communication systems. Now, with sophisticated technology, many automobile electronic components use mobile data terminals and other memory intensive products. People who use memory intensive communication systems in their cars or trucks need to leave the systems on when the vehicle is unattended, and not worry about draining the battery. With modern technology, this can include waiting for a page from a control center, status reporting or in-coming data. The most common reasons, however, are the inconvenience of manually turning the system off each time one leaves the vehicle, and connecting numerous electronic equipment to the battery which will drain the car battery.

U.S. Pat. No. 4,950,913 describes a unit designed to determine when the motor is not running. The unit detects the battery being discharged and this condition starts a timer which will eventually disconnect the radio or other connected equipment at the end of a pre-set time. If the battery is weak, a separate voltage detector will override the timer and shut the radio off. This condition will continue until the vehicle is started, thereby activating a vibration detector which will reset the system.

With memory intensive communication systems, a more serious problem arises that U.S. Pat. No. 4,950,913 cannot solve. Memory intensive systems, normally, need the data saved prior to shutdown so this data is not lost. When the unit of U.S. Pat. No. 4,950,913 disconnects to a memory intensive system prior to any data save routine, the data or information is lost. This problem can occur for a number of reasons. One reason is that the unit of U.S. Pat. No. 4,950,913 can shut the system down. Another reason is that there could be a brief power interruption which can reset the unit. Or, the battery may be weak and the input voltage can fall below the regulator's 10 volt threshold. This voltage failure will cause the regulator to draw excessive current in attempt to keep power in the system. Like each mentioned direct or indirect shutdowns, the results are disastrous for the user of the equipment because the data in the memory intensive electronics is lost.

Accordingly, a device is needed to delay shutdown so a memory save can be performed. This device should not only include many of the features previously set forth in U.S. Pat. No. 4,950,913, but also include an emergency override feature to protect memory intensive communication systems.

SUMMARY OF THE INVENTION

The programmable timer power switch with emergency override reset, hereinafter referred to as PTPS, is an electronic device that, when installed into a motor vehicle, will keep the battery from discharging to a point where it can no longer charge or turn over a motor from a cold start. When the situation arises, the user can choose to keep operating any equipment, e.g., CB, radio, or computer terminal, that is connected through the PTPS for a pre-selected period of time after the vehicle motor has been turned off.

This preselected period delays the time at which power is switched off to all equipment connected to the PTPS unit. Also, the unit prevents further drainage of voltage by inhibiting the voltage regulator. The time interval is user programmable. During this delay cycle, the PTPS is constantly monitoring for a low voltage battery level or any sudden surges due to faulty equipment or poor charging which would causes the battery to be weak and inoperative.

Should any of the noted conditions be detected, the PTPS unit will deactivate the power switch from the battery, thus preventing the load through the PTPS from contributing to permanent damage to the battery. In an emergency situation, such as when the battery voltage falls below a voltage capable of starting the motor, the PTPS can be overridden manually through an external switch. When activated, this switch will bypass normal control circuitry and re-connect power to all the equipment connected through the PTPS. The PTPS will override the system automatically as well for a short period of time and allow the user to operate the connected equipment.

One embodiment of the invention is illustrated in the figures and will be described in greater detail below and with reference to these figures.

DESCRIPTION OF THE PREFERRED EMBODIMENTS

Figure 1:
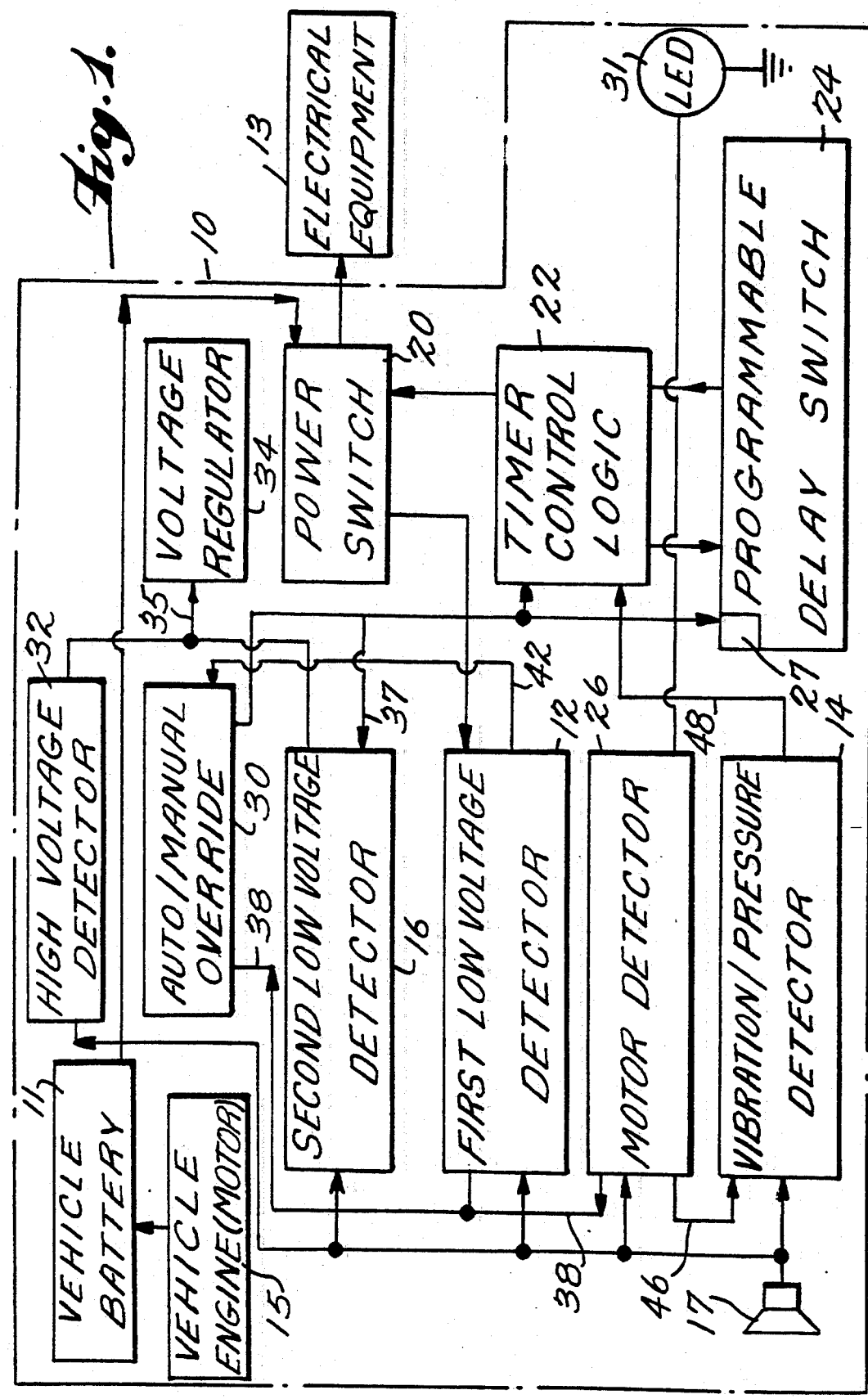
FIG. 1 is a block diagram of the programmable timer switch unit with emergency override reset.

FIG. 1 is a block diagram of the PTPS unit with emergency override reset generally indicated by numeral 10. PTPS unit 10 is connected between a vehicle battery 11 and electrical equipment 13. PTPS unit 10 consists of a number of detectors, switches and logic components.

There is a first low voltage detector 12 for detecting the voltage of the motor battery 11. There is a vibration/sound/pressure detector 14 with unit 17 which detects vibrations, sounds or electronic noises from the motor 15. There is a second low voltage detector 16 which detects voltage from the vehicle battery 11. There is a motor detector 26 which sets a minimum vehicle battery voltage for operating vehicle battery 11. There is a timer/control logic unit 22 which receives signals from the vibration/pressure detector 14 and auto/manual override switch 30. There is a power switch 20 which controls the on-off power from the vehicle battery 11 to the electrical equipment 13. There is a programmable time delay switch 24 which can be manually set, and a LED 31 to visually indicate fault conditions.

The auto/manual override switch 30 receives a set input from the first low voltage detector 12 and a reset input from the motor detector 26 to override the timer/control logic 22 of the system and turn "on" and "off" power switch 20. The auto/manual override switch 30, also, disables the second low voltage detector 16 and starts the timer 27 of programmable delay switch 24 to avoid any unnecessary interruptions of output power.

Additionally, PTPS unit 10 with emergency override reset includes a high voltage detector 32 for detecting voltage of the motor battery 11. Also, the unit 10 has a voltage regulator 34 for regulating the voltage. The voltage regulator 34 includes an inhibit 35 which receives signals from the high voltage detector 32 or the second low voltage detector 16.

Each component within PTPS unit 10 is interdependent and performs specific functions necessary for proper control and operation.

When vehicle motor 15 is ON, battery 11 charges to its full capacity. This charge raises the voltage level to approximately 14.5 volts D.C. During this time, vibration/sound/pressure detector 14 monitors for vehicle vibrations, and verifies the engine is either in idle or moving mode. Both the first low voltage 12 and second low voltage 16 detectors are in a constant testing state.

'Unless the battery 11 is poorly charged, vehicle alternator (not shown) is not functional or equipment 13 is faulty as connected to the PTPS unit 10, these two detectors, 12 and 16, will not flag any fault conditions. A fault condition is indicated on the respective outputs of the detectors.

The first low voltage detector 12 receives voltage from the battery 11 and an enable signal from power switch 20. This detector 12 watches for a battery voltage below 11 volts D.C. When the voltage drops below 11 volts, a signal is sent to auto/manual override 30.

The second low voltage detector 16 receives voltage from the battery 11 and monitors to ensure the battery voltage does not fall below 10 volts D.C. Normally, this detector 16 will operate immediately unless it is disabled 37 by the auto/manual override 30 until the override 30 times out, at which time, detector 16 becomes activated and sends an inhibit signal 35 to voltage regulator 34.

When the vehicle engine 15 is in idle or moving mode, the detectors 12, 16, and 26 indicate normal conditions and the auto/manual override switch 30 is OFF. Now, PTPS unit 10 automatically activates the power switch 20 and power is sent to all equipment 13 connected to the vehicle battery 11 by way of PTPS unit 10. Under these conditions, power switch 20 will only be deactivated if a low voltage level or any excess current is detected.

When vehicle motor 15 is turned OFF, and the vehicle generator (not shown) has been deactivated, the battery voltage resumes a voltage level of 12 volts D.C. With the delay timer 24 programmed to some selected time period, such as 1-15 hours, time/control logic 22 will continue to activate power switch 20 without any interruptions, but will start the delay timer 24 counting down the selected time interval. At this time, should no flags from any detector exist, delay timer 24 will proceed counting to zero and deactivate power switch 20 at the end of the time period.

On the other hand, if a low voltage fault is detected during the countdown period, an automatic/manual override will occur and timer/control logic 22 will immediately reset the timer 24 to minimum. Unless reset by first low voltage detector 12, timer/logic unit 22 will disable the power switch 20 and disconnect power to all equipment 13 which is controlled by the PTPS unit 10.

The first low voltage detector 12 and the motor detector 26 will now be described with reference to FIG. 2a.

When the engine is initially started, a fixed reference voltage on the inverting input 53 of detector 26 is established. In detector 26, the minimum threshold voltage is set at 13 volts D.C. Initially, the voltage on the inverting input 53 of the detector 26 will not be established and the output 46 of the detector 26 remains HIGH. This causes auto/manual override 30 to signal timer/control logic 22 to disable power switch 30.

In other words, the voltage on the inverting input is less than the voltage on the non-inverting input of the detector 12. Once the voltage level on the non-inverting input becomes high, this causes the output of the detector 12 to reverse to a normal LOW level, and auto/manual override 30 signals timer/controller logic 30 to enable power switch 20. Accordingly, detector 12 looks for a voltage above 11 volts, anything less is considered a fault and a signal is generated.

With PTPS unit 10 operational, should vehicle battery 11 ever go below the reference voltage set at first low voltage detector 12, a signal is generated at the output 42 of the detector 12 and sent to timer/control logic 22 by way of auto/manual override 30 to disable power switch 20. This signal is generated whether vehicle motor 15 is in idle, moving or OFF modes, and will remain until the voltage level has been corrected, such as replacing the battery or alternator. In emergency situations, auto/manual override switch 30 can override timer control logic 22 and allow power switch 20 to continue to operate as long as the manual switch 44 of circuit 30 is activated.

Figure 2A:
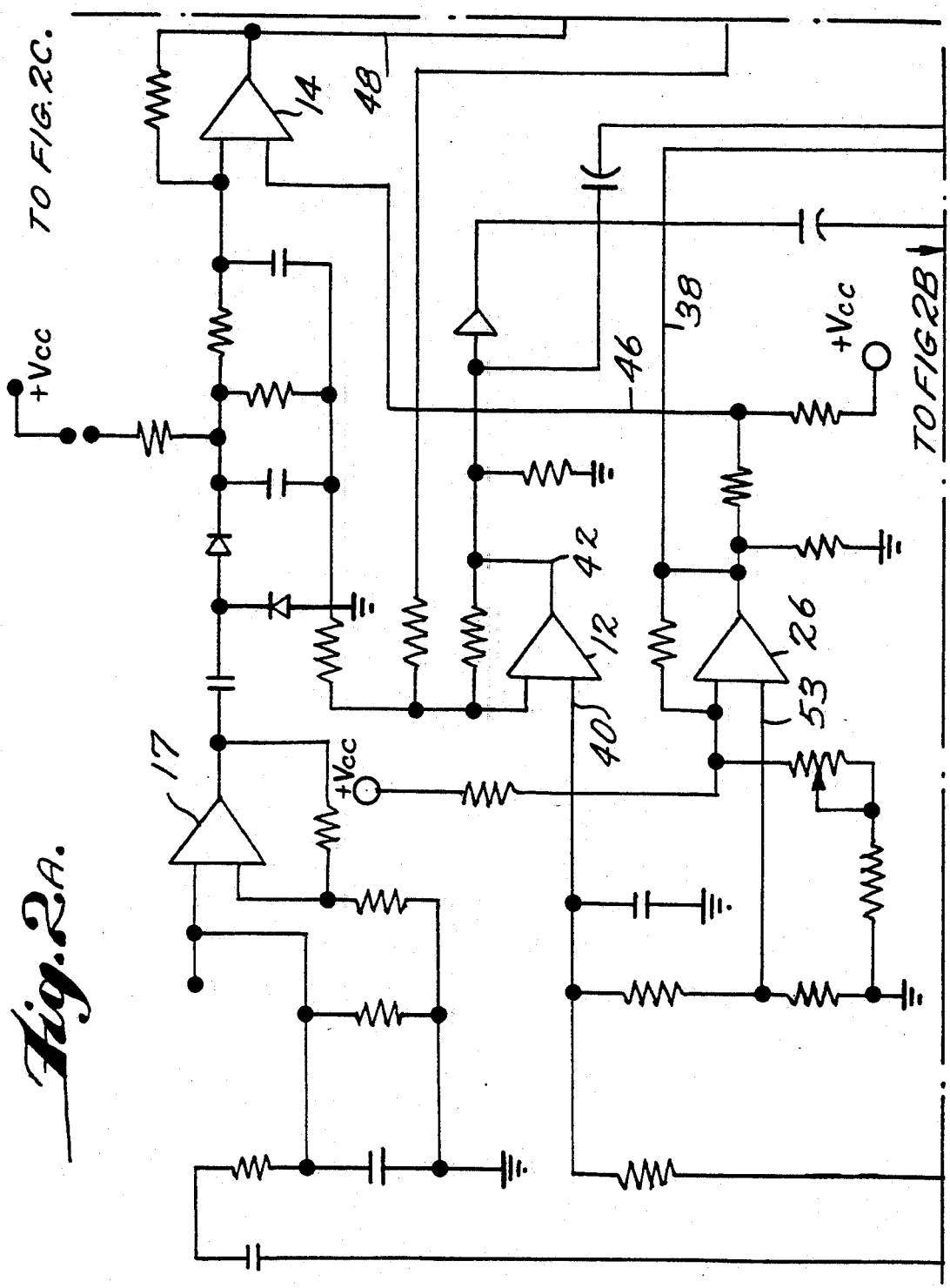
FIG. 2a is a schematic circuit diagram of a sound amplifier and detector, and first and second low voltage detectors.

Still referring to FIG. 2a, motor detector 26 detects whether the alternator (not shown) is charging battery 11 to its full capacity by reflecting an elevated voltage of approximately 14.5 volts D.C. Motor detector 26 compares a fixed reference voltage of 10 volts with a ratio of the elevated voltage and verifies a battery voltage somewhere above 13.0 volts D.C. The motor detector 26 sends a motor "on" signal 46 to vibration/pressure unit 14. The output signal 46 is compared with a signal from the noise unit 17 and the vibration/pressure detector 14 passes a confirmation signal 48 to timer/control logic 22. This signal 48 indicates that the vehicle motor 15 is operating and is in idle or moving mode. The combination of these two detectors, (i.e., 14 and 26), prevents false operation and vehicle tampering or any external method of deception.

Additionally, motor detector 26 sends signal 38 to disable auto/manual override 30, which in turn prevents emergency signal 50 to timer/control logic 22.

Figure 2B:
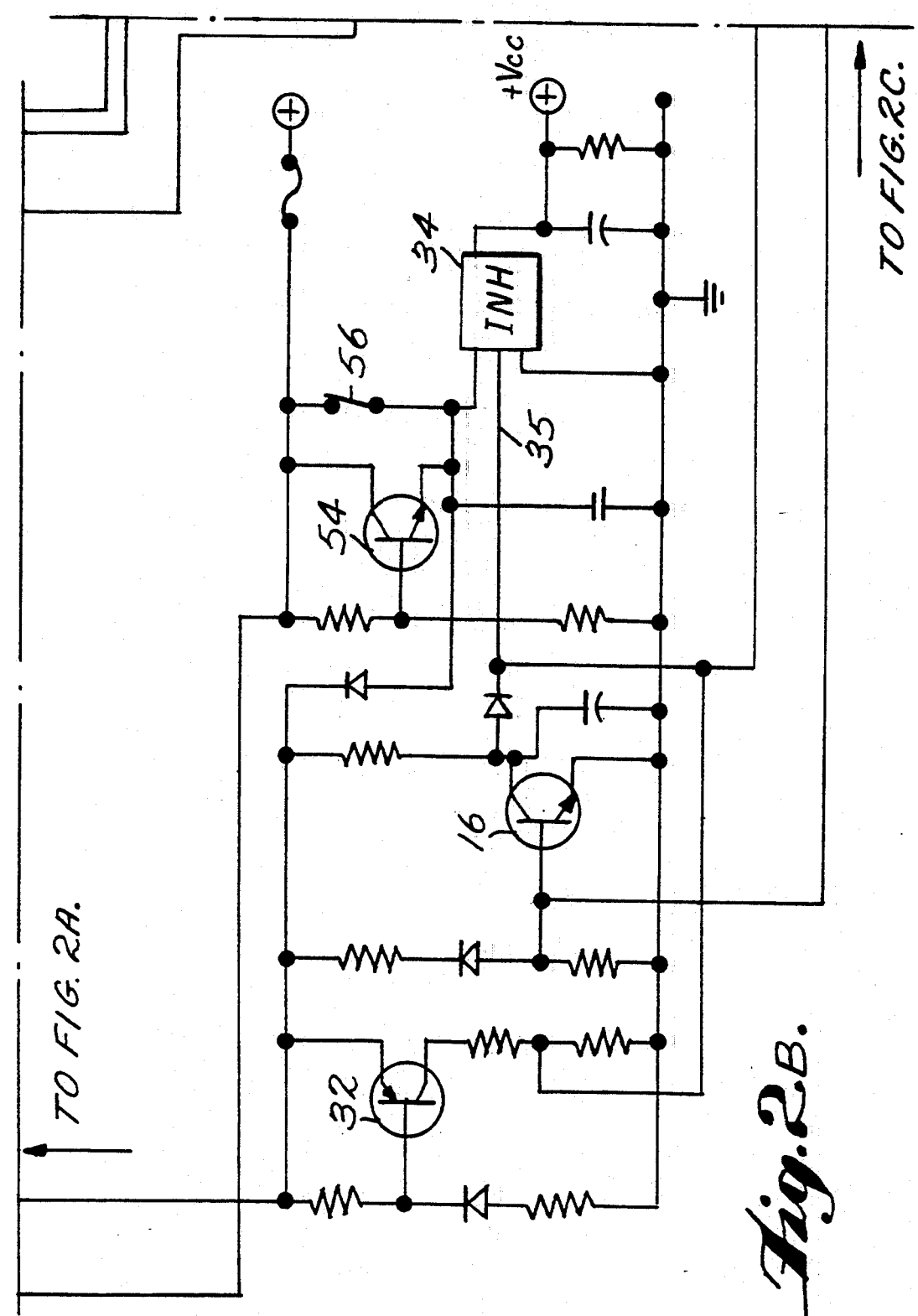
FIG. 2b is a schematic circuit diagram of a high voltage shut-down detector, a low voltage shut-down detector, and made in accordance with the present invention.

No referring to FIG. 2b, while PTPS unit 10 is operating, the second low voltage detector 16 is ready to test for excessive current or other electrical failures that might occur, such as shorts or faulty equipment.

The second low voltage detector 16 monitors the level of current consumed by the equipment 13. Detector 16 is set to receive the battery voltage. This voltage is compared to a threshold level. The threshold level is a preset D.C. voltage and corresponds to a minimum allowable rate of discharge or current usage for the PTPS unit 10.

In other words, when the input battery voltage falls below the 10 volt threshold set by the second low voltage detector 16, the voltage regulator 34 is shut-down by way of an inhibit signal 35. If the regulator 34 is allowed to draw current to maintain the regulated 10 volt output, an excessive drain on the battery is caused. This drain will damage the battery and eliminate data stored in the memory intensive electrical equipment 13. Accordingly, whenever the sampled voltage is less than the threshold level, the rate of current consumption exceeds the normal safe level of usage, and the second low voltage detector 16 will inhibit the voltage regulator 34 from drawing any more current. The second low voltage detector 16 is disabled for the duration of an auto/manual override.

Referring again to FIG. 2a, vibration/sound/pressure detector 14 allows PTPS 10 to monitor and determine whether vehicle motor 15 is in idle, moving or OFF modes. Vibration, sounds or noise are sensed through the unit 17, which can be a transducer or an amplifier. This noise can include electronic noise as well as engine sounds. The output of an AC voltage is filtered, conditioned, and applied to a non-inverting input of the unit 17 as a D.C. voltage. The inverting input of the unit 17 has a DC-reference voltage.

This reference voltage is enabled only through motor detector 26 and corresponds to a preset level of vibration and noise sensitivity. When vehicle motor 15 is in idle or moving modes, the non-inverting input of unit 17 will be higher than the inverting input and will produce a HIGH on the output. This HIGH signal will be sent to the timer/control logic 22 by way of vibration/pressure detector 14 which will determine whether power switch 20 should be activated.

Should vehicle motor 15 be in the OFF mode, the output of noise unit 17 will be LOW, and this LOW signal will keep power switch 20 disabled.

Figure 2C:
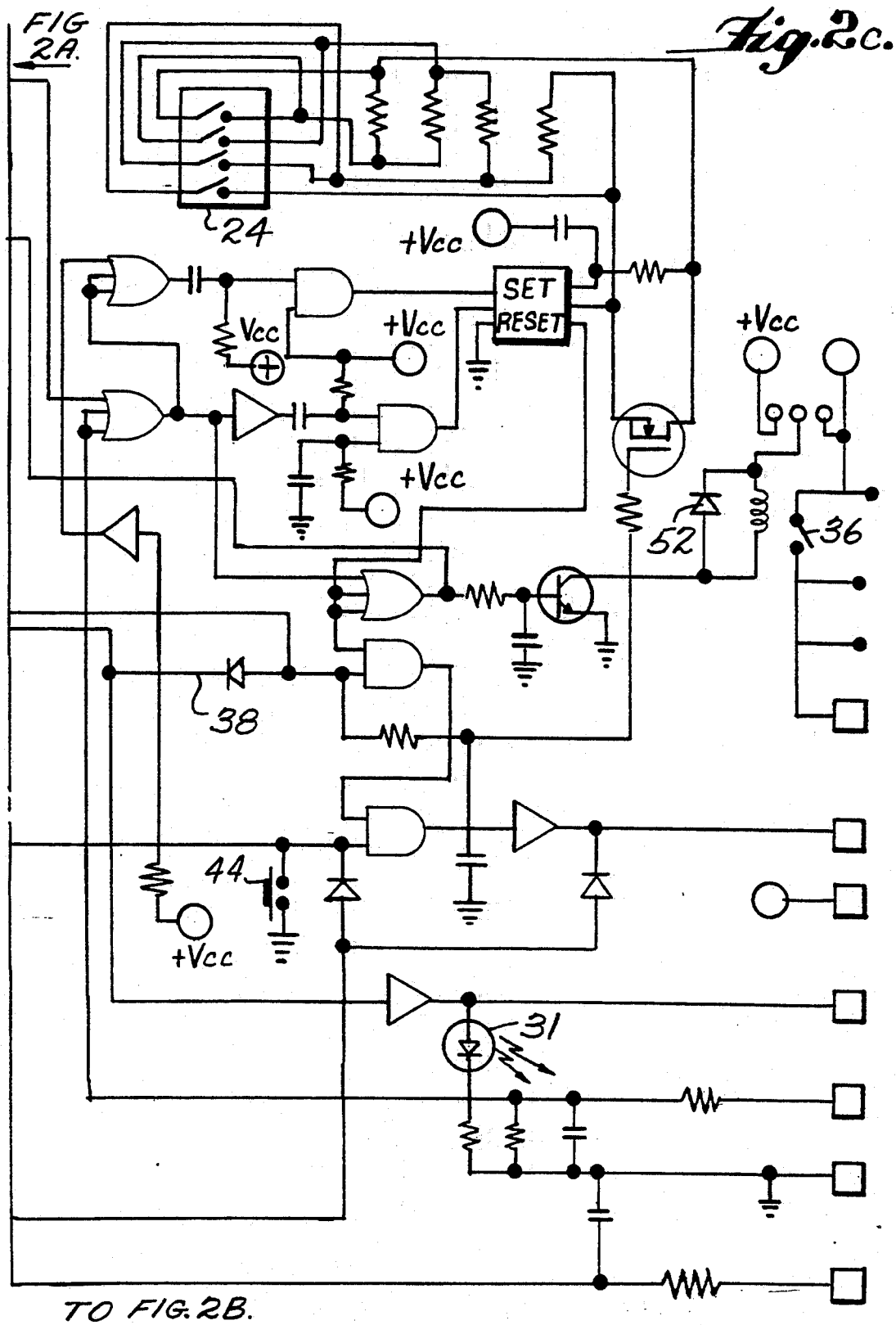
FIG. 2c is a schematic circuit diagram of an auto/manual override, programmable delay switch, and timer control logic made in accordance with the present invention.

With reference to FIG. 2c, under the condition where vehicle motor 15 has just been turned OFF and no reset situation exists, a trigger pulse is generated. This trigger pulse is ½ the normal pulse when vehicle motor 34 is in idle or moving modes. This pulse activates delay timer circuit 24 automatically and keeps power switch 20 enabled.

Referring to FIG. 1 and FIG. 2c, timer/control logic 22 of PTPS unit 10 keeps track of all conditions being monitored and starts as well as resets the delay timer 24 and controls power switch 20. The delay timer 24 can be preprogrammed by the user through a DIP or rotary switch. For example, a time of 15 minutes to 15 hours, in any increments, could be set. This allows power switch 20 to conduct until the end of the pre-selected delay period.

Power switch 20 is essentially controlled through timer/control logic circuit 22. It consists of a basic transistor driver and relay 36 that is rated for high current. When a HIGH is received from timer/control circuit 22, relay 36 will engage. The engaging of relay 36 permits current to flow to equipment 13 connected through PTPS unit 10. The operation of the manual portion of auto/manual override 30 is included by way of a switch 44 in the case of an emergency.

As can be appreciated, the PTPS unit 10 with emergency override reset includes several resistors, capacitors and diodes as well as other off the shelf components which will not be explained in detail because they perform auxiliary functions.

Now with reference to FIG. 1, the operation of the emergency override will be explained. If the power switch 20 is on and a failure condition is detected, by detector 26, a SET or error signal 42 will be sent to auto/manual override 30. After receiving an indication of an emergency or fault condition, auto/manual override 30 generates emergency signal 50. Accordingly, the delay timer 27 is set and power switch 20 is operated for a predetermined time period.

When the PTPS unit 10 is in the time-out mode with relay 36 operated (engine OFF and two-way radio on) the unit 10 will switch to emergency override if a low battery voltage is detected. By utilizing the automatic reset of the auto/manual override 30, the unit 10 returns to normal when the engine 15 is started. Positioned in programmable delay switch 24 is the timer 27 which builds in a delay (e.g. any time frame can be selected). If the relay 36 is not activated when a low battery voltage is detected, the regulator 34 will shut-down with no delay.

In other words, and reference to FIGS. 2a, 2b and 2c, relay 36 must be turned on in time-out mode to enable the first low voltage detector 12. This allows the auto/manual override switch 30 to be triggered when less than 11 volts are detected. Time-out will occur in 15 minutes and enable the second low voltage detector unless the voltage rises above 11 volts. If more than 11 volts are available, the detector 12 signals switch 30 which RESETS the timer 27 to normal pre-set time delay.

Now, if less than 11 volts are available, switch 30 triggers the timer 27 which starts to count down from a predetermined time period which is less than the pre-selected time period set in the programmable delay switch 24. The reason for this different time period is because the voltage may very well fall below 10 volts which will trigger the second low voltage detector 16 and will shut down the system entirely. Normally, 15 minutes has been found to be adequate.

To restart the system of unit 10, one merely has to start the engine. The sound or noise from the engine will trigger motor detector 26 to look for 13 volts and when the battery 11 exceeds 13 volts the signal is sent to vibration/pressure detector 14 which in turn notifies timer/control logic 22 to operate in normal mode.

The foregoing is considered as illustrative only of the principles of the invention. Further, since numerous modifications and changes will readily occur to those skilled in the art, it is not desired to limit the invention to the exact construction and operation shown and described. For example, if a 24 volt model is preferred rather than 12 volts, circuit 54 can be implemented by cutting or opening line 56. It is also possible that timer could be set at any limit from zero to infinity because of the flexibility of the circuitry. Accordingly, all suitable modification and equivalents may be resulted to falling within the scope of the invention which is intended to be limited only by the scope of the claims.

I claim:

1. A programmable timer power switch unit having an emergency override reset, said unit comprising:
   power switch means receiving power from a motor battery and switching the power to equipment powered by the motor battery;
   detector means connected to the motor battery for detecting potential charges of the battery and comparing the detected potential charges to predetermined reference voltages;
   vibration/sound/pressure detector connected to said detector means for monitoring the comparison of the voltages with vibrations of the motor battery, and providing a mode signal representing battery on, idle or moving;
   auto/manual override switch connected to said detector means for receiving a comparison signal and for sending a result signal based on the comparison;
   timer-control logic receiving the signals from said vibration-pressure detector and said auto/manual override switch for controlling said power switch means based on the received signals; and
   programmable delay means connected to said timer-control logic and said auto/manual override switch for enabling said timer-control logic for a pre-determined selected time.

2. The programmable timer power switch unit of claim 1, wherein said detector means comprises:
   means for detecting voltages by monitoring voltages consumed by the equipment and comparing the voltages consumed with threshold levels, said means for detecting voltages sending signals based on the comparison with the threshold levels; and
   motor detector for detecting a charge of the battery by comparing the detected charge with a fixed reference and verifying the comparison with a motor start signal to said vibration/sound/pressure detector and a disable signal to said auto/manual override switch.

3. The programmable timer power switch unit of claim 2, wherein said means for detecting voltages, includes:
   first low voltage detector connected to the battery, said motor detector and said auto/manual override switch for monitoring the equipment and providing a signal to said auto/manual override switch; and
   second low voltage detector connected to said battery and said auto/manual override switch for receiving a disabling signal from said auto/manual override switch, said second low voltage detector enabled whenever the voltage of the battery is below a regulated voltage to prevent battery drainage.

4. The programmable timer power switch unit of claim 1, wherein said timer-control logic comprises:
   means for receiving a fault signal and delaying said power switch means when the fault signal indicates a comparison of the threshold levels; and
   reset means connected to said programmable delay switch for resetting said programmable delay switch.

5. The programmable timer power switch unit of claim 1, wherein said detector means comprises:
   high voltage detector for comparing an initial voltage of the battery means with a high reference voltage during power-up or reset and inhibiting a voltage regulator when the battery voltage exceeds the high reference voltage.

6. The programmable timer power switch unit of claim 1, wherein said vibration-pressure detector comprises:
   means for sensing sounds from the battery;
   transforming means connected to said sensing means for receiving and transforming the sensed vibrations or sounds to a voltage level; and
   means for indicating connected to said sensing means for receiving said voltage level and comparing said voltage level to indicate the battery is in an ON mode rather than an OFF mode.

7. The programmable timer power switch unit of claim 6, further comprising:
   said vibration/sound/pressure detector connected to said timer-control logic for resetting said programmable delay switch and for disabling said power switch means whenever said indicating means indicates the mode of the battery is OFF.

8. The programmable timer power switch unit of claim 1, wherein said programmable delay means comprises:
   means for pre-selecting time wherein the pre-selected time includes at least 15 minutes to 15 hours and is selectable in increments; and
   reset means connected to said time-control logic so that said time-control logic can be reset by said programmable delay means.

9. A programmable timer power switch unit for use with a battery and an engine, said unit comprising:
   power switch means receiving power from the battery and switching the power to equipment powered by the battery;
   voltage regulator receiving voltage from the battery and detecting current for regulating the voltage to maintain a minimum voltage to be consumed by the equipment;
   motor detector receiving voltage from the battery, said motor detector detecting the battery is ON and at a specific level of charge;
   vibration-pressure detector receiving a signal from said motor detector indicating the battery has the specific level of charge and detecting a mode of the battery means;
   auto/manual override switch connected to said motor detector for receiving a signal that the battery is ON and at said specific level of charge;
   timer-control logic receiving signals from said auto/-manual override switch and said vibration-pressure detector, said timer-control logic determining from the received signals whether a fault exists, if said fault exists, said timer-control logic disables said power switch; and
   programmable delay means connected to said timer-control logic and said auto/manual override switch for enabling said timer-control logic for a pre-selected time.

10. The programmable timer power switch unit of claim 9, further including a plurality of voltage detectors, said voltage detectors monitoring voltage consumed by the equipment and comparing the voltages consumed with threshold levels, wherein the threshold levels correspond to maximum and minimum voltage usage, and said plurality of voltage detectors sending signals whenever the threshold levels are exceeded; and
   said motor detector detecting the charge of the battery by comparing the detected charge with a fixed reference and verifying the comparison with a signal to permit said vibration-pressure detector to indicate the mode.

11. The programmable timer power switch unit of claim 9, wherein said timer-control logic comprises:
error input means connected to said comparing means for receiving an error signal and disabling said power switch means when the error signal indicates the threshold levels are exceeded; and
reset means connected to said error input means and said programmable delay switch for resetting said programmable delay switch whenever said power switch means is disabled based on the error signal.

12. The programmable timer power switch unit of claim 9, wherein said unit further comprises:
first low voltage detector for comparing an initial voltage of the battery With a reference voltage during power-up or reset and indicating to said auto/manual override switch the battery voltage falls below the reference voltage at which time said auto/manual override switch signals said timer-control logic to enable said power switch means.

13. The programmable timer power switch unit of claim 12, wherein said first low voltage detector comprises:
low voltage op-amp means having a non-inverting input, wherein the reference voltage on the non-inverting input is established and indicates a status of power-up/reset to said auto/manual override switch which in turn signals said timer control logic to maintain said power switch in the operated mode, and said low-voltage op-amp enabled only when said power switch is operating.

14. The programmable timer power switch unit of claim 13, wherein said timer-control logic comprises:
power-up/reset input means connected to said low voltage op-amp means for resetting said programmable delay switch and to maintain said power switch means.

15. The programmable timer power switch unit of claim 9, wherein said vibration/sound/pressure detector comprises:
means for sensing vibrations or sounds of the engine;
transforming means connected to said sensing means for receiving and transforming the sensed vibrations or sounds to a voltage level; and
mode means connected to said sensing means for receiving said voltage level and comparing said voltage level to signify the battery is either in idle or moving modes rather than an OFF mode.

16. The programmable timer power switch unit of claim 15, wherein said timer-control logic comprises:
input means for resetting said programmable delay switch and for disabling said power switch means whenever the mode of the battery means is OFF.

17. The programmable timer switch of claim 15, wherein said sensing means includes a transducer.

18. The programmable timer switch of claim 15, wherein said sensing means include an amplifier.

19. The programmable timer power switch unit of claim 9, wherein said programmable delay means comprises:
means for pre-selecting time wherein the pre-selected time includes at least one to fifteen hours and is selectable in increments; and
timer means connected to said auto/manual override, said timer means providing a short delay period which is a minimum selectable time independent of the pre-selected time.

20. The programmable timer power switch unit of claim 9, wherein said programmable delay means comprises:
second low voltage detector operating when the battery voltage falls below the regulated voltage to inhibit said regulator; and
means for preventing the inhibit connected to said auto/manual override switch, and said means operating when said auto/manual override switch operates.

* * * * *